(12) United States Patent
Li et al.

(10) Patent No.: US 10,893,563 B2
(45) Date of Patent: Jan. 12, 2021

(54) METHOD AND APPARATUS FOR HANDLING SENSING FOR SIDELINK RESOURCE IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 7 days.

(21) Appl. No.: 16/444,863

(22) Filed: Jun. 18, 2019

(65) Prior Publication Data

US 2020/0008258 A1 Jan. 2, 2020

Related U.S. Application Data

(60) Provisional application No. 62/692,524, filed on Jun. 29, 2018.

(51) Int. Cl.
*H04W 76/18* (2018.01)
*H04W 76/14* (2018.01)
*H04W 24/10* (2009.01)
*H04W 52/10* (2009.01)
*H04W 72/04* (2009.01)

(52) U.S. Cl.
CPC .......... *H04W 76/18* (2018.02); *H04W 24/10* (2013.01); *H04W 52/10* (2013.01); *H04W 72/0446* (2013.01); *H04W 76/14* (2018.02)

(58) Field of Classification Search
CPC ..... H04W 76/18; H04W 76/14; H04W 24/10; H04W 52/10; H04W 72/0446; H04W 72/1289; H04W 72/04; H04W 28/16; H04W 72/1231; H04W 72/1257;
(Continued)

(56) References Cited

U.S. PATENT DOCUMENTS 9,723,630 B2 * 8/2017 Xue .................. H04W 74/0816
10,536,949 B2 * 1/2020 Sheng ................... H04W 76/14
(Continued)

FOREIGN PATENT DOCUMENTS

WO 2017150959 9/2017
WO 2018027528 2/2018

OTHER PUBLICATIONS

Zhang, Deyu, et al. "Energy-harvesting-aided spectrum sensing and data transmission in heterogeneous cognitive radio sensor network." IEEE Transactions on Vehicular Technology 66.1 (2016): 831-843. (Year: 2016).*
(Continued)

*Primary Examiner* — Sharad Rampuria
(74) *Attorney, Agent, or Firm* — Blue Capital Law Firm, P.C.

(57) ABSTRACT

Methods and apparatuses for handling sensing for a sidelink source in a wireless communication system are disclosed herein. In one method, a User Equipment (UE) receives a control signaling which schedules a resource of a first transmission, in which the control signaling informs and/or indicates that the scheduled resource is not kept for a next transmission. The UE performs energy sensing for candidate resources, in which one or more resources associated with the scheduled resource of the first transmission is not utilized for energy sensing.

15 Claims, 12 Drawing Sheets

(58) Field of Classification Search
CPC .... H04W 72/12; H04W 76/00; H04B 7/2123; H04J 2203/0069; H04Q 2213/394
See application file for complete search history.

(56) References Cited

U.S. PATENT DOCUMENTS

2017/0188391 A1* 6/2017 Rajagopal ......... H04W 74/0816
2018/0235008 A1  8/2018 Park et al.

OTHER PUBLICATIONS

ZTE: "Considerations for UE SPS resource selection and indication", 3GPP Draft; R1-166978-7.2.2.2.2 Considerations for UE SPS Resource, 3rd Generation Partnership Project (3GPP), Mobile Competence Centre; 650, Route Des Luci0les: F-06921 S0phia-Antip0lis Cedex vol. RAN WG1, No. Gothenburg, Sweden; Aug. 22, 2016-Aug. 26, 2016, Aug. 21, 2016 (Aug. 21, 2016), XP051125654.
European Search Report in corresponding EP Application No. 19180733.8, dated Feb. 11, 2020.

* cited by examiner

METHOD AND APPARATUS FOR HANDLING SENSING FOR SIDELINK RESOURCE IN A WIRELESS COMMUNICATION SYSTEM

CROSS-REFERENCE TO RELATED APPLICATIONS

The present application claims the benefit of U.S. Provisional Patent Application Ser. No. 62/692,524 filed on Jun. 29, 2018, the entire disclosure of which is incorporated herein in its entirety by reference.

FIELD

This disclosure generally relates to wireless communication networks, and more particularly, to a method and apparatus for handling sensing for sidelink resource in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In one method, a User Equipment (UE) receives a control signaling which schedules a resource of a first transmission, in which the control signaling informs and/or indicates that the scheduled resource is not kept for a next transmission. The UE performs energy sensing for candidate resources, in which one or more resources associated with the scheduled resource of the first transmission is not utilized for energy sensing.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.1.0 (2018-03), "E-UTRA; Physical layer procedures (Release 15); and TS 36.214 V15.1.0 (2018-03), "E-UTRA); Physical layer; Measurements (Release 15). The standards and documents listed above are hereby expressly incorporated by reference in their entirety.

Figure 1:
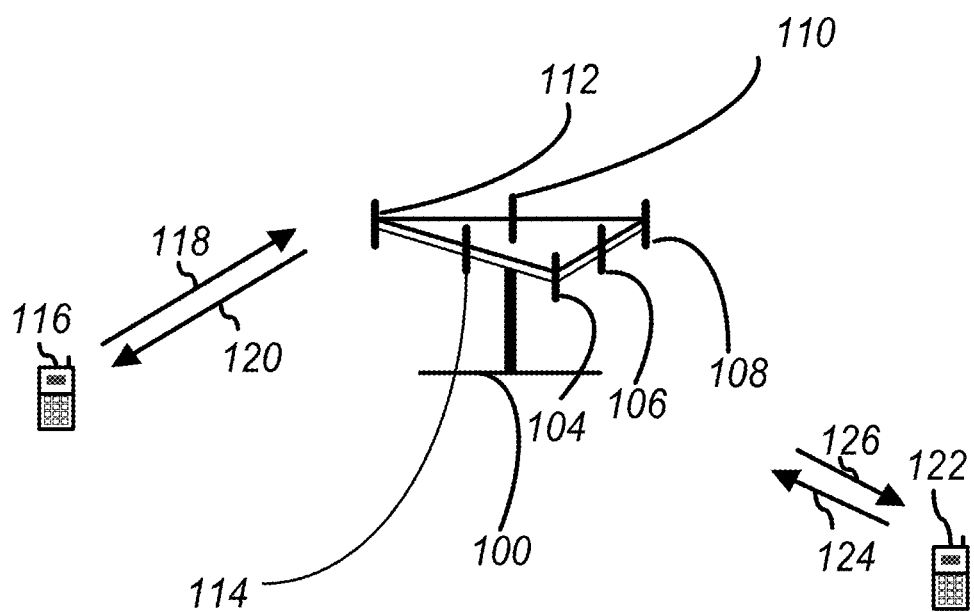
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122.

Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
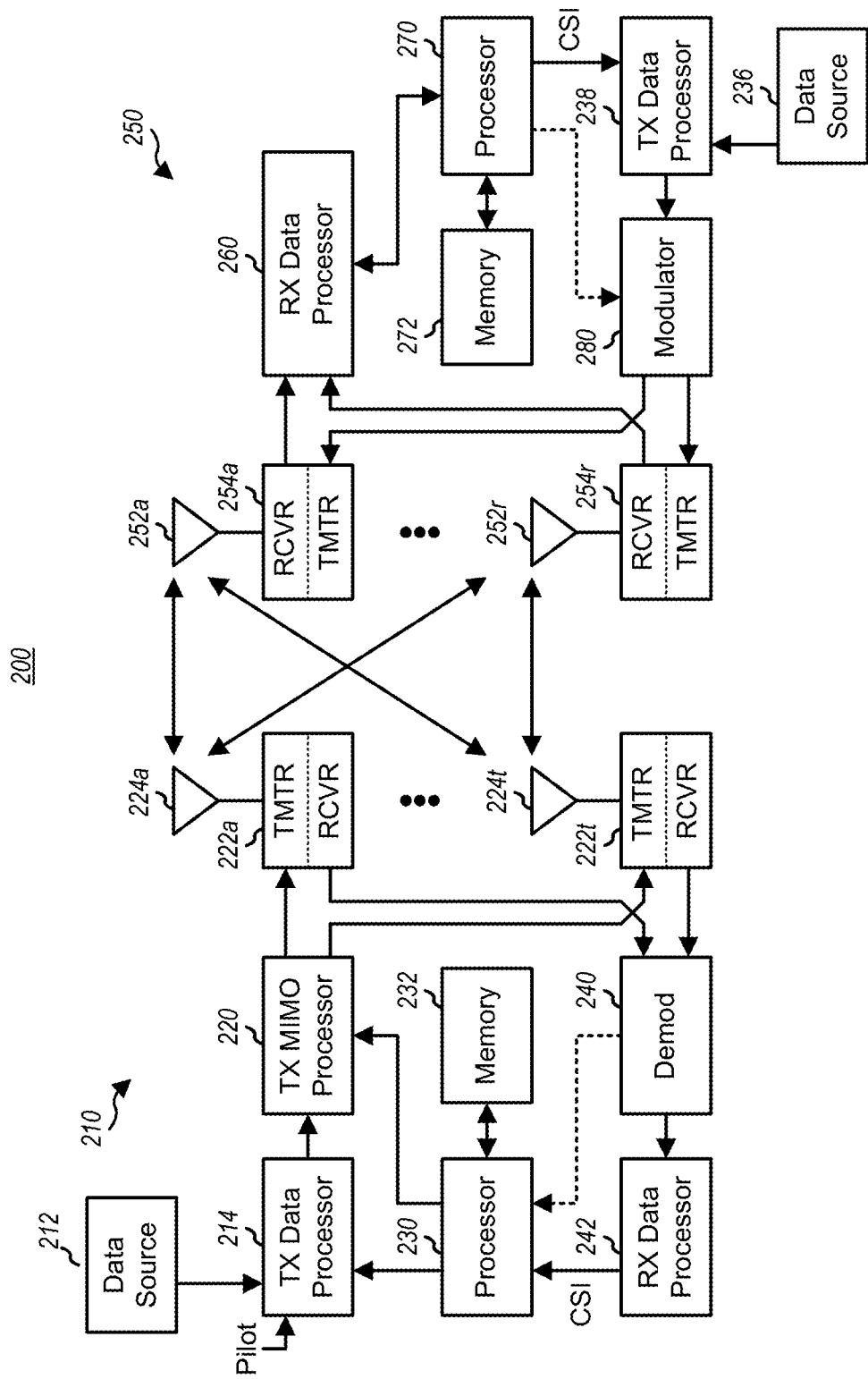
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
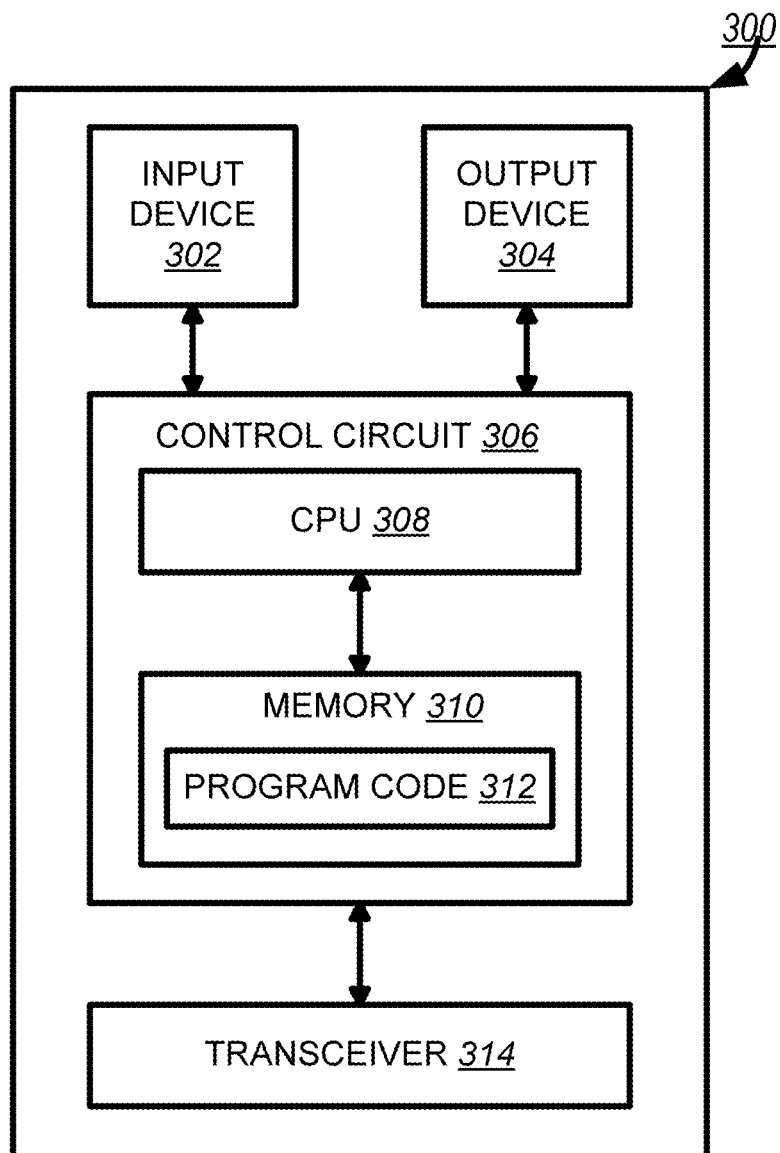
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
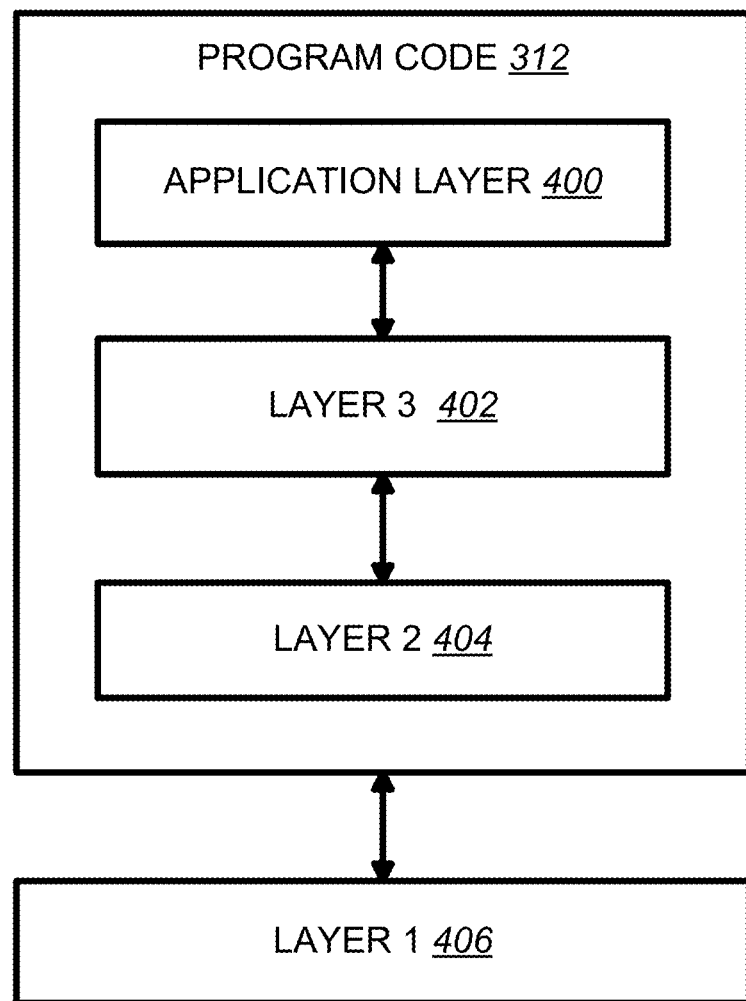
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 V15.1.0 (2018-03) specifies the UE procedure for determining the subset of resources to be reported to higher layers in PSSCH resource selection in sidelink transmission mode 4 as quoted below:

14.1.1.6 UE procedure for determining the subset of resources to be reported to higher layers in PSSCH resource selection in sidelink transmission mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $\text{prio}_{TX}$ the priority to be transmitted in the associated SCI format 1 by the UE are all provided by higher layers. $C_{reset}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}-1$. The UE shall assume that any set of $L_{subcH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$ and $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL}$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
the UE has not monitored subframe $t_z^{SL}$ in Step 2.
there is an integer j which meets $y+j \times P_{rsvp\_TX}'=z+P_{step} \times k \times q$ where j=0, 1, ..., $C_{reset}-1$, $P_{rsvp\_TX}'=P_{step} \times P_{rsvp\_TX}/100$, k is any value allowed by the higher layer parameter restrictResourceReservationPeriod and q=1, 2, ..., Q. Here, $$Q = \frac{1}{k}$$

if k<1 and $n'-z \leq P_{step} \times k$, where $t_{n'}^{SL}=n$ if subframe n belongs to the set $t_0^{SL}, t_1^{SL}, \ldots, t_{T_{max}}^{SL}$ otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
the UE receives an SCI format 1 in subframe $t_m^{SL}$, and "Resource reservation" field and "Priority" field in the received SCI format 1 indicate the values $P_{rsvp\_RX}$ and $\text{prio}_{RX}$, respectively according to Subclause 14.2.1.
PSSCH-RSRP measurement according to the received SCI format 1 is higher than $Th_{prio_{TX}, prio_{RX}}$.
the SCI format received in subframe $t_m^{SL}$ or the same SCI format 1 which is assumed to be received in subframe(s) $t_{m+q \times P_{step} \times P_{rsvp\_RX}}^{SL}$) determines according to 14.1.1.4C the set of resource blocks and sub-frames which overlaps with $R_{x, y+j \times P_{rsvp\_TX}}'$, for q=1, 2, ..., Q and j=0, 1, $C_{reset}-1$. Here, $$Q = \frac{1}{P_{rsvp\_RX}}$$

if $P_{rsvp\_RX}<1$ and $n'-m \leq P_{step} \times P_{rsvp\_RX}$, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$ otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}-1$ in the monitored subframes in Step 2 that can be expressed by $$t_{y-P_{step}*j}^{SL}$$

for a non-negative integer) it $P_{rsvp\_TX} \geq 100$, and $$t_{y-P'_{rsvp\_TX}*j}^{SL}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$, The UE shall report set $S_B$ to higher layers.

If partial sensing is configured by higher layers then the following steps are used:

1) A candidate single-subframe resource for PSSCH transmission $R_{x,y}$ is defined as a set of $L_{subcH}$ contiguous sub-channels with sub-channel x+j in subframe $t_y^{SL}$ where j=0, ..., $L_{subCH}-1$. The UE shall determine by its implementation a set of subframes which consists of at least Y subframes within the time interval $[n+T_1, n+T_2]$ where selections of $T_1$ and $T_2$ are up to UE implementations under $T_1 \leq 4$ and $20 \leq T_2 \leq 100$. UE selection of $T_2$ shall fulfil the latency requirement and Y shall be greater than or equal to the high layer parameter minNumCandidateSF. The UE shall assume that any set of $L_{subcH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.
   PSSCH-RSRP measurement according to the received SCI format 1 is higher than $Th_{prio_{TX},prio_{RX}}$,
   the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x, y+j \times P_{rsvp\_TX}'}$ for q=1, 2, . . . , Q and j=0, 1, . . . , $C_{reset}$−1. Here, $$Q = \frac{1}{P_{rsvp\_RX}} \text{ if}$$

$P_{rsvp\_RX}<1$ and $y'-m \le P_{step} \times P_{rsvp\_RX}+P_{step}$, where $t_{y'}^{SL}$, is the last subframe of the Y subframes, and Q=1 otherwise.
6) If the number of candidate single-subframe resources remaining in the set $S_A$ is smaller than $0.2 \cdot M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $$t_{y-P_{step} \cdot j}^{SL}$$

for a non-negative integer j.

8) The UE moves the candidate single-subframe resource $R_{x,y}$ with the smallest metric E from the set $S_A$ to $S_B$. This step is repeated until the number of candidate single-subframe resources in the set $S_B$ becomes greater than or equal to $0.2 \cdot M_{total}$.

The UE shall report set $S_B$ to higher layers.

3GPP TS 36.214 V15.1.0 (2018-03) specifies some measurements for sidelink transmission as quoted below:

| 5.1.28 Sidelink Received Signal Strength Indicator (S-RSSI) | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe The reference point for the S-RSSI shall be the antenna connector of the UE. If receiver diversity is in use by the UE, the reported value shall not be lower than the corresponding S-RSSI of any of the individual diversity branches |
| Applicable for | RRC_IDLE intra-frequency, RRC_IDLE inter-frequency, RRC_CONNECTED intra-frequency, RRC_CONNECTED inter-frequency |
| 5.1.29 PSSCH Reference Signal Received Power (PSSCH-RSRP) | |
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |
| Applicable for | RRC_IDLE intra-frequency, RRC_IDLE inter-frequency, RRC_CONNECTED intra-frequency, RRC_CONNECTED inter-frequency |

NOTE:
The power per resource element is determined from the energy received during the useful part of the symbol, excluding the CP.

For Vehicle-to-Everything (V2X) and/or Pedestrian-to-Everything (P2X) transmissions, there are at least two transmission modes: one is scheduled via the network, such as sidelink transmission mode 3 as disclosed in 3GPP TS 36.213 V15.1.0 (2018-03); another one is sensing-based transmission, such as sidelink transmission mode 4 as disclosed in 3GPP TS 36.213 V15.1.0 (2018-03). Since the sensing-based transmission is not scheduled by the network, the UE requires performing sensing before selecting a resource for transmission in order to avoid resource collision and interference from or in other UEs.

Figure 5:
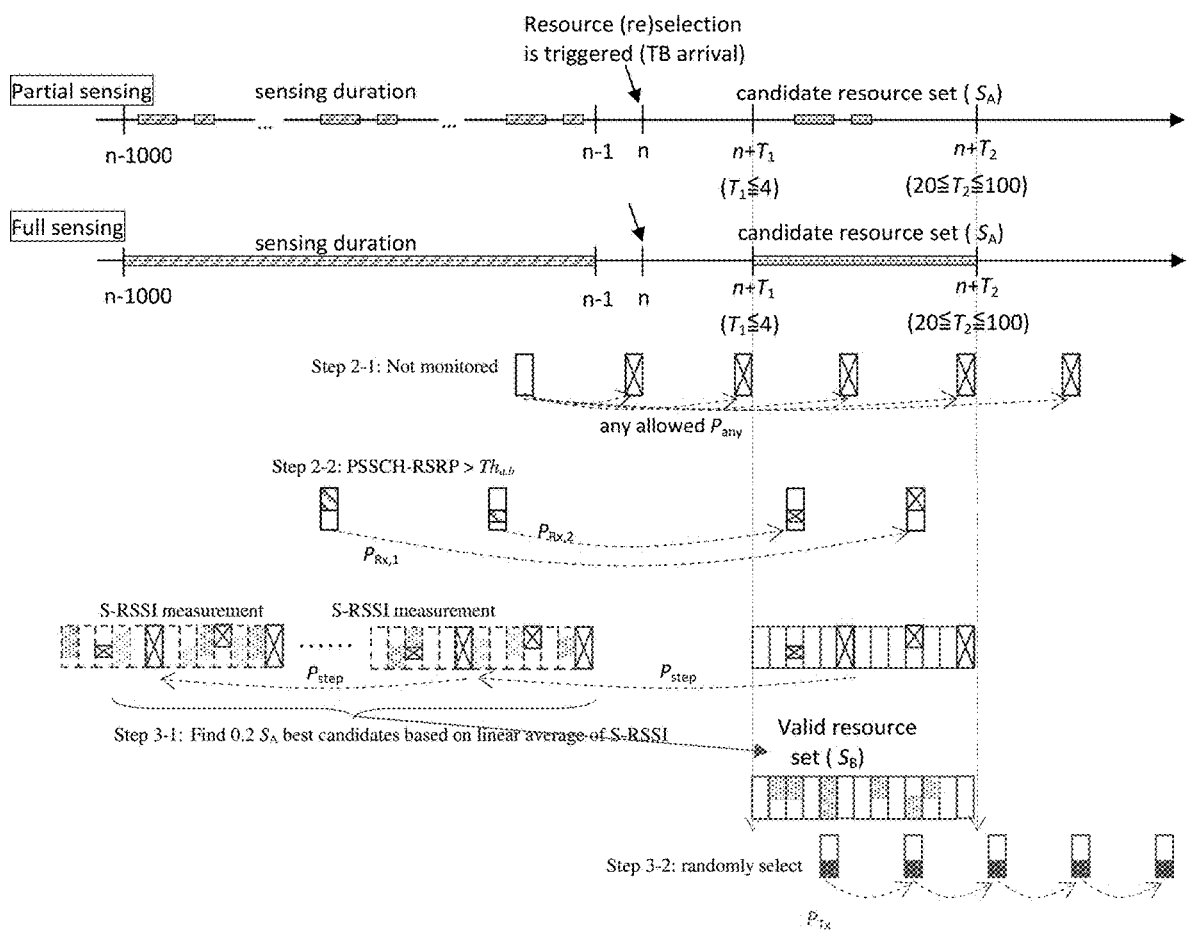
FIG. 5 illustrates a sensing-based resource selection procedure.

For the sensing-based resource selection procedure, the UE has a candidate resource set including multiple candidate resources as shown in FIG. 5. The available candidate resource set is restricted with a time interval [n+$T_1$, n+$T_2$]. The restricted time interval may be different depending on whether partially sensing is configured or not. Full sensing may mean that partially sensing is not configured. In one embodiment, a candidate resource may mean one candidate single-subframe resource. One candidate resource may include one or multiple resource units. The resource unit may be a subchannel. In one embodiment, the resource unit may include multiple (physical) resource blocks in a Transmission Time Interval (TTI). The TTI may be a subframe.

Based on the sensing within a sensing duration, the UE may generate a valid resource set, wherein the valid resource set is a subset of the candidate resource set. The generation of the valid resource set may be performed via excluding some candidate resources from the candidate resource set, for instance, step 2-1 and step 2-2 as shown in FIG. 5. The generation of the valid resource set may be performed via selecting some valid candidate resources, for instance, step 3-1 as shown in FIG. 5. And then, the UE selects one or some valid resources from the valid resource set to perform a transmission from the UE. The valid resource selection for transmission may be randomly selected from the valid resource set, for instance, step 3-2 as shown in FIG. 5.

As disclose in 3GPP TS 36.213 V15.1.0 (2018-03), the first excluding step is if the UE does not monitor/sense a TTI z, the UE cannot expect whether the candidate resources in TTI "z+$P_{any}$" are occupied or not, wherein $P_{any}$ means any possible periodicity for a transmission. For instance, the first excluding step is shown as step 2-1 in FIG. 5. For the case of $P_{any}$>=100 ms, the UE excludes the candidate resources in TTI "z+$P_{any}$" and excludes the candidate resources for which the UE may have possible transmission occurred in TTI "z+$P_{any}$". For the case of $P_{any}$<100 ms, the UE excludes the candidate resources in TTI "z+q·$P_{any}$" and excludes the candidates resources for which the UE may have possible transmission occurred in TTI "z+q·$P_{any}$", wherein q is 1, 2, . . . , 100/$P_{any}$. The parameter q means the UE excludes multiple candidate resources with a period $P_{any}$ within a time interval [z, z+100]. The possible transmission may mean a transmission on a selected valid resource. The possible transmission means a periodic transmission of a transmission on a selected valid resource. Moreover, $P_{any}$ means any possible periodicity configured by higher layer.

The second excluding step is the UE may exclude the candidate resources according to the received control signaling if the UE receives/detects a control signaling in a TTI m. For instance, the second excluding step is shown as step 2-2 in FIG. 5. More specifically, if the UE receives/detects a control signal scheduling a transmission in a TTI m and the measurement result of the scheduled transmission and/or the control signal is over a threshold, the UE may exclude the candidate resources according to the received control signaling. The measurement result may be Reference Signal Received Power (RSRP). More specifically, the measurement result may be Physical Sidelink Shared Channel-Reference Signal Received Power (PSSCH-RSRP). The control signaling may indicate the resources of the scheduled transmission and/or periodicity of the scheduled transmission, $P_{RX}$. The excluded candidate resources, according to the received control signaling, are the resources of the next scheduled transmission based on the resources of the scheduled transmission and periodicity of the scheduled transmission, such as for the case of $P_{RX}$>=100 ms. Moreover, the excluded candidate resources, according to the received control signaling, are the resources of the next multiple scheduled transmissions based on the resources of the scheduled transmission and the periodicity of the scheduled transmission, such as for the case of $P_{RX}$<100 ms. The next multiple scheduled transmissions may be with a period $P_{RX}$ within the time interval [m, m+100]. If the control signaling indicates that there is no next scheduled transmission, the resource of scheduled transmission is not kept in the next time, the scheduled transmission is the last transmission from the UE transmitting the control signaling, or the control signaling indicates that the periodicity of the scheduled transmission is indicated as zero, the UE may not exclude candidate resources according to the received control signaling.

After the first excluding step and the second excluding step, the UE may select some valid candidate resources from the remaining candidate resources as shown in step 3-1 in FIG. 5. The UE may measure the resources in the sensing duration, wherein the measured resources are associated with the remaining candidate resources after steps 2-1 and 2-2. More specifically, for a remaining candidate resource, the associated measured resources in the sensing duration are in the occasions with multiple times of a time period from the remaining candidate resources. For instance, if the time period is 100 TTIs, the associated measured resources in the sensing duration are in the TTI "n−j·100", j is positive integer, for a remaining candidate resource in TTI n. Moreover, the associated measured resources in the sensing duration have the same frequency resources as the remaining candidate resource. Additionally, the measurement may be a Sidelink-Received Signal Strength Indicator (S-RSSI) measurement. Based on the measurement, the UE can derive a metric for each remaining candidate resource. The metric for a remaining candidate resource may be a linear average of the S-RSSI measured from its associated measured resources in the sensing duration. And then, the UE may select valid candidate resources based on the metric of each remaining candidate resource. In one scenario, an action is a remaining candidate resource with the smallest metric being selected as valid candidate resource and moved into a valid resource set. This action is repeated until the UE selects a number of remaining candidate resources as valid candidate resources and moves the number of remaining candidate resources into the valid resource set. For instance, the number may be larger than or equal to 20% of total candidate resources. In one embodiment, the number may be larger than or equal to 20% of the cardinality of the candidate resource set.

Based on the current (partially) sensing procedure, the UE can determine the valid resource set. The valid resource set may be reported to higher layers for transmission from the UE. The UE may select one or some of the valid resources from the valid resource set to perform transmission from the UE. The transmission from the UE may be a Physical Sidelink Shared Channel (PSSCH) transmission.

As described in the second excluding step, the sensing UE may exclude the candidate resources according to the received control signaling. If a control signaling indicates that there is no next scheduled transmission, the resource of the scheduled transmission is not kept in the next time, the scheduled transmission is the last transmission from the UE transmitting the control signaling, or the periodicity of the scheduled transmission is indicated as zero, the sensing UE may not exclude candidate resources according to the received control signaling. Such control signaling in a TTI m may not only schedule a transmission in a TTI m but also imply that the resource of the scheduled transmission will be clear after TTI m. If such control signaling also schedules a retransmission of the scheduled transmission in TTI "m+$T_{gap}$", such control signaling also implies that the resource of the retransmission of the scheduled transmission will be clear after TTI "m+$T_{gap}$". This means that a transmitting UE transmitting such control signaling will not keep this resource for a scheduled transmission. Thus, a candidate resource associated with the resource of the scheduled transmission may be available for the sensing UE. However, since the transmitting UE has already transmitted a scheduled transmission in TTI m and before TTI m, the derived metric of the associated candidate resource may not be low enough. It can be inferred that the sensing UE may not be able to move the associated candidate resource into a valid resource set. As a result, even though such control signaling implies that the resource of the scheduled transmission will be clear, the resource may be still not utilized for a long time, up to 1000 ms.

To solve this issue, one alternative is the resources for energy sensing depend on the received control signaling. More specifically, if a received control signaling schedules a resource of a first transmission and also informs/indicates that the scheduled resource is not kept for the next transmission, the previous resource(s) associated with the scheduled resource of the first transmission is not utilized for energy sensing. In one embodiment, if a received control signaling schedules a resource of a first transmission and also informs/indicates that the first transmission is the last transmission (based on the scheduled resource), the previous resource(s) associated with the scheduled resource of the first transmission is not utilized for energy sensing. In one embodiment, when a UE performs energy sensing to derive a metric for candidate resources, the previous resource(s) associated with the scheduled resource of the first transmission is not utilized for derivation of the metric. The energy sensing result of the previous resource(s) associated with the scheduled resource of the first transmission may be set to zero.

In one embodiment, the scheduled resource of the first transmission is not utilized for energy sensing. In one scenario, when a UE performs energy sensing to derive a metric for candidate resources, the scheduled resource of the first transmission is not utilized for the derivation of the metric. The energy sensing result of the scheduled resource of the first transmission may be set to zero.

In one embodiment, the latter resource(s) associated with the scheduled resource of the first transmission is utilized for energy sensing. In one scenario, when a UE performs energy sensing to derive a metric for candidate resources, the latter resource(s) associated with the scheduled resource of the first transmission is utilized for the derivation of the metric. In one scenario, the resource(s) after or posterior to the scheduled resource of the first transmission is utilized for energy sensing. In another scenario, when a UE performs energy sensing to derive a metric for candidate resources, the resource(s) after or posterior to the scheduled resource of the first transmission is utilized for derivation of the metric.

The previous resource(s) associated with the scheduled resource of the first transmission means the resource(s) before the scheduled resource of the first transmission have the same frequency resources as the scheduled resource of the first transmission, and include the time difference on one or multiple times of a time period from the scheduled resource of the first transmission.

The latter resource(s) associated with the scheduled resource of the first transmission means the resource(s) after the scheduled resource of the first transmission have the same frequency resources as the scheduled resource of the first transmission, and include the time difference on one or multiple times of a time period from the scheduled resource of the first transmission.

The resource(s) after or posterior to the scheduled resource of the first transmission means the resource(s) after the scheduled resource of the first transmission have the same frequency resources as the scheduled resource of the first transmission, and include the time difference on one or multiple times of a time period from the scheduled resource of the first transmission.

The previous resource(s) associated with the scheduled resource of the first transmission means the resource(s) before the scheduled resource of the first transmission are using the same identity (e.g., scheduling identity, Radio Network Temporary Identifier (RNTI), destination ID, source ID, UE ID, Semi-Persistent Scheduling (SPS) configuration index, grant free configuration index, combinations of previous IDs) as the scheduled resource of the first transmission, and include the time difference on one or multiple times of a time period from the scheduled resource of the first transmission.

The latter resource(s) associated with the scheduled resource of the first transmission means the resource(s) after the scheduled resource of the first transmission are using the same identity (e.g. scheduling identity, RNTI, destination ID, source ID, UE ID, SPS configuration index, grant free configuration index, combinations of previous IDs) as the scheduled resource of the first transmission, and include the time difference on one or multiple times of a time period from the scheduled resource of the first transmission.

The resource(s) after or posterior to the scheduled resource of the first transmission means the resource(s) after the scheduled resource of the first transmission are using the same identity (e.g. scheduling identity, RNTI, destination ID, source ID, UE ID, SPS ID, grant free ID, combinations of previous IDs) as the scheduled resource of the first transmission, and include the time difference on one or multiple times of a time period from the scheduled resource of the first transmission.

The control signaling informs and/or indicates that the scheduled resource is not kept for the next transmission may mean that the control signaling indicates that there is no next scheduled transmission on the resource.

In one embodiment, the control signaling informs and/or indicates that the scheduled resource is not kept for the next transmission may mean that the control signaling indicates that the resource of scheduled first transmission is not kept in next time.

In one embodiment, the control signaling informs and/or indicates that the scheduled resource is not kept for the next transmission may mean that the periodicity of the scheduled transmission is indicated as zero.

In one embodiment, the control signaling informs and/or indicates that the scheduled resource is not kept for the next transmission may mean that the scheduled transmission is not a periodic transmission.

In one embodiment, the control signaling informs and/or indicates that the scheduled resource is not kept for the next transmission may mean that the scheduled transmission is a periodic transmission to be released.

In one embodiment, the control signaling informs and/or indicates that the scheduled resource is not kept for the next transmission may mean that the scheduled transmission is the last transmission from the UE transmitting the control signaling (at least within many of time periods).

In one embodiment, the control signaling informs and/or indicates that the first transmission is the last transmission may mean that the control signaling indicates that there is no next scheduled transmission on the resource (after the first transmission).

In one embodiment, the control signaling informs and/or indicates that the first transmission is the last transmission may mean that the control signaling indicates that the resource of scheduled first transmission is not kept (after the first transmission).

In one embodiment, the control signaling informs and/or indicates that the first transmission is the last transmission may mean that the periodicity of the scheduled (first) transmission is indicated as zero.

In one embodiment, the control signaling informs and/or indicates that the first transmission is the last transmission may mean that the scheduled (first) transmission is not a periodic transmission.

In one embodiment, the control signaling informs and/or indicates that the first transmission is the last transmission may mean that the scheduled (first) transmission is a periodic transmission to be released.

In another alternative, if a UE receives a signaling indicating that a candidate resource is clear, the UE does not perform energy sensing for the indicated candidate resource. In one embodiment, if a UE receives a signaling indicating that a candidate resource is clear, the UE performs energy sensing for the candidate resources, except for the indicated candidate resource.

In one embodiment, if a UE receives a signaling indicating that a candidate resource is clear and if the UE performs energy sensing for the candidate resources and selects valid resources from the candidate resources based on the energy sensing result, the UE may consider the indicated candidate resource as a valid resource. The UE may perform a second transmission on at least one of the valid resources.

In one embodiment, if a UE receives a signaling indicating that a candidate resource is clear and when the UE performs energy sensing to derive a metric for the candidate resources, the UE may consider the metric of the indicated candidate resource as a specific value. In one scenario, the specific value is zero or is considered to be the smallest value. In another scenario, the specific value is the smallest value amongst the derived metrics for the candidate resources.

In one embodiment, the signaling may mean a control signaling which schedules a resource of a first transmission and informs and/or indicates that the scheduled resource is not kept for next transmission, and the indicated candidate resource may mean a candidate resource which is associated with the resource of the first transmission.

In one embodiment, the signaling may mean a control signaling which schedules a resource of a first transmission and informs and/or indicates that the scheduled resource of the first transmission is not kept for the next time, and the indicated candidate resource may mean a candidate resource which is associated with the resource of the first transmission.

In one embodiment, the signaling may mean a control signaling which schedules a resource of a first transmission and informs and/or indicates that the scheduled (first) transmission is not a periodic transmission, and the indicated candidate resource may mean a candidate resource which is associated with the resource of the first transmission.

In one embodiment, the signaling may mean a control signaling which schedules a resource of a first transmission and informs and/or indicates that the scheduled (first) transmission is a periodic transmission to be released, and the indicated candidate resource may mean a candidate resource which is associated with the resource of the first transmission.

In one embodiment, the signaling may mean a control signaling which schedules a resource of a first transmission and informs and/or indicates that the periodicity of the scheduled (first) transmission is indicated as zero, and the indicated candidate resource may mean a candidate resource which is associated with the resource of the first transmission.

In one embodiment, the signaling may mean a control signaling which schedules a resource of a first transmission and informs and/or indicates that the scheduled first transmission is the last transmission, and the indicated candidate resource may mean a candidate resource which is associated with the resource of the first transmission.

In one embodiment, the indicated candidate resource may include the frequency resource of the scheduled first transmission in a frequency domain, and the indicated candidate resource may be with a time difference on one or multiple times of a time period from the resource of the scheduled first transmission.

In one embodiment, the UE does not perform energy sensing on a resource(s) which is associated with the indicated candidate resource. In one embodiment, the resource(s) associated with the indicated candidate resource means the resource(s) before the indicated candidate resource have the same frequency resources as the indicated candidate resource and have a time difference on one or multiple times of a time period from the indicated candidate resource.

In one embodiment, the UE does not perform energy sensing on resource(s) which is associated with the scheduled resource of the first transmission. In one embodiment, the resource(s) associated with the scheduled resource of the first transmission include previous resource(s) associated with the scheduled resource of the first transmission, the scheduled resource of the first transmission, the latter resource(s) associated with the scheduled resource of the first transmission, and/or resource(s) after/posterior to the scheduled resource of the first transmission. In one embodiment, the energy sensing result of the previous resource(s) associated with the scheduled resource of the first transmission, the scheduled resource of the first transmission, the latter resource(s) associated with the scheduled resource of the first transmission, and/or the resource(s) after/posterior to the scheduled resource of the first transmission may be set as zero.

In one embodiment, the resource(s) associated with the scheduled resource of the first transmission include the previous resource(s) associated with the scheduled resource of the first transmission and the scheduled resource of the first transmission. In one embodiment, the energy sensing result of the previous resource(s) associated with the scheduled resource of the first transmission and the scheduled resource of the first transmission may be set as zero.

In one embodiment, the previous resource(s) associated with the scheduled resource of the first transmission means the resource(s) before the scheduled resource of the first transmission have the same frequency resources as the scheduled resource of the first transmission, and include the time difference on one or multiple times of a time period from the scheduled resource of the first transmission.

In one embodiment, the latter resource(s) associated with the scheduled resource of the first transmission means the resource(s) after the scheduled resource of the first transmission have the same frequency resources as the scheduled resource of the first transmission, and include the time difference on one or multiple times of a time period from the scheduled resource of the first transmission.

In one embodiment, the resource(s) after/posterior to the scheduled resource of the first transmission means the resource(s) after the scheduled resource of the first transmission have same frequency resources as the scheduled resource of the first transmission, and include the time difference on one or multiple times of a time period from the scheduled resource of the first transmission.

In one embodiment, the previous resource(s) associated with the scheduled resource of the first transmission means the resource(s) before the scheduled resource of the first transmission are using the same identity (e.g. scheduling identity, RNTI, destination ID, source ID, UE ID, SPS configuration index, grant free configuration index, combinations of previous IDs) as the scheduled resource of the first transmission, and include the time difference on one or multiple times of a time period from the scheduled resource of the first transmission.

In one embodiment, the latter resource(s) associated with the scheduled resource of the first transmission means the resource(s) after the scheduled resource of the first transmission are using the same identity (e.g. scheduling identity, RNTI, destination ID, source ID, UE ID, SPS configuration index, grant free configuration index, combinations of previous IDs) as the scheduled resource of the first transmission, and include the time difference on one or multiple times of a time period from the scheduled resource of the first transmission.

In one embodiment, the resource(s) after/posterior to the scheduled resource of the first transmission means the resource(s) after the scheduled resource of the first transmission are using the same identity (e.g. scheduling identity, RNTI, destination ID, source ID, UE ID, SPS ID, grant free ID, combinations of previous IDs) as the scheduled resource of the first transmission, and include the time difference on one or multiple times of a time period from the scheduled resource of the first transmission.

Figure 6:
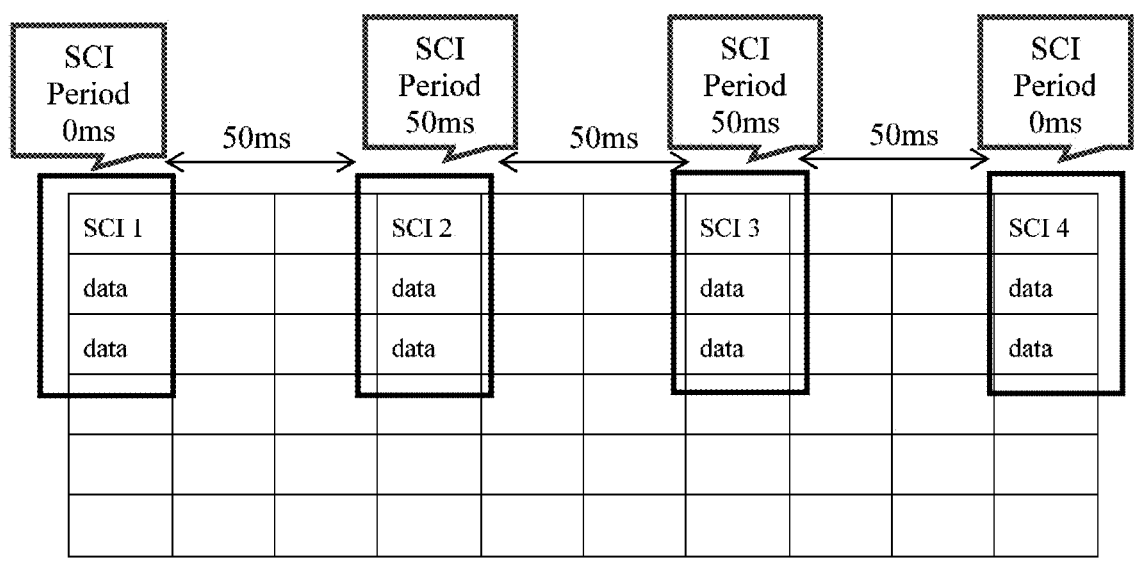
FIG. 6 illustrates a resource associated with a scheduled resource.

One example for a resource associated with the scheduled resource is shown in FIG. 6. For a receiving UE, the Sidelink Control Information (SCI) 1 could be indicating a single Medium Access Control (MAC) Protocol Data Unit (PDU) transmission or a release of multiple MAC PDU transmissions. After the SCI 1 is received, a SCI 2 is received by the same UE. The SCI 2 indicates a resource reservation period of 50 ms. After the SCI 2 is received, a SCI 3 is received by the same UE. The SCI 2 indicates a resource reservation period of 50 ms. After the SCI 3 is received, a SCI 4 is received by the same UE. The SCI 4 will be interpreted as a release of multiple MAC PDU transmissions based on the SCI 3. And the SCI 3 and/or the SCI 2 and/or the data transmission corresponding to SCI 3 and/or the data transmission corresponding to SCI 2 could be considered as a resource associated with the transmission related to SCI 4. And the SCI 1 and the corresponding data transmission will not be considered as a resource associated with the transmission related to SCI 4/SCI 3/SCI 2.

Figure 7:
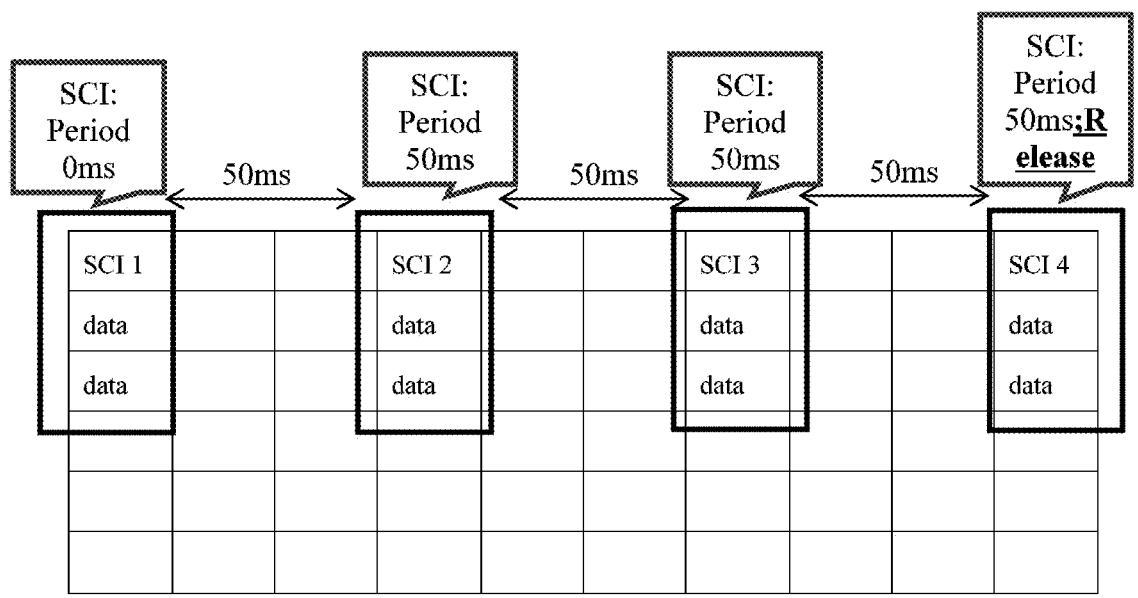
FIG. 7 illustrates another resource associated with a scheduled resource.

Another possible example for a resource associated with the scheduled resource is shown in FIG. 7. As discussed in the previous example, the UE will not consider SCI 1 as the resource associated with the transmission related to SCI 4/SCI 3/SCI 2. And the SCI 3 and/or the SCI 2 and/or the data transmission corresponding to SCI 3 and/or the data transmission corresponding to SCI 2 could be considered as a resource associated with the transmission related to SCI 4.

Figure 8:
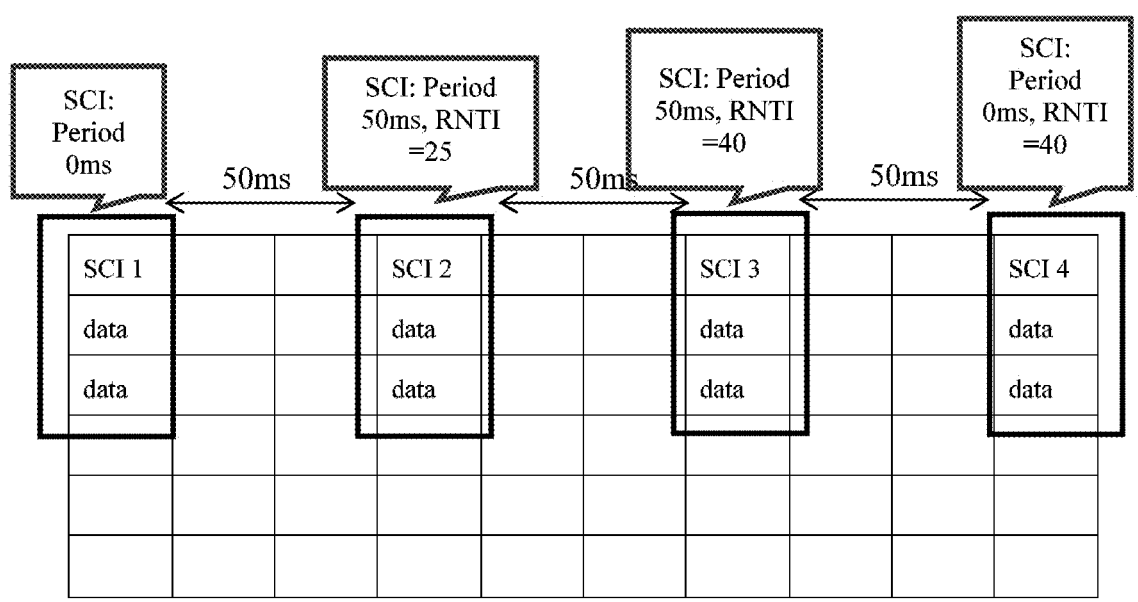
FIG. 8 illustrates another resource associated with a scheduled resource.

Another possible example for a resource associated with the scheduled resource is shown in FIG. 8. As discussed in the previous examples, the UE will not consider SCI 1 as a resource associated with a transmission related to SCI 4/SCI 3/SCI 2. And the SCI 2 and/or the data transmission corresponding to SCI 2 are also not considered as a resource associated with the transmission related to SCI 4 due to an identity difference (e.g., Radio Network Temporary Identifier (RNTI)). And the SCI 3 and/or data transmission corresponding to SCI 3 will be considered as a resource associated with a transmission related to SCI 4. The UE considers the association based on the period information in each SCI and/or identity and/or frequency resource.

Figure 9:
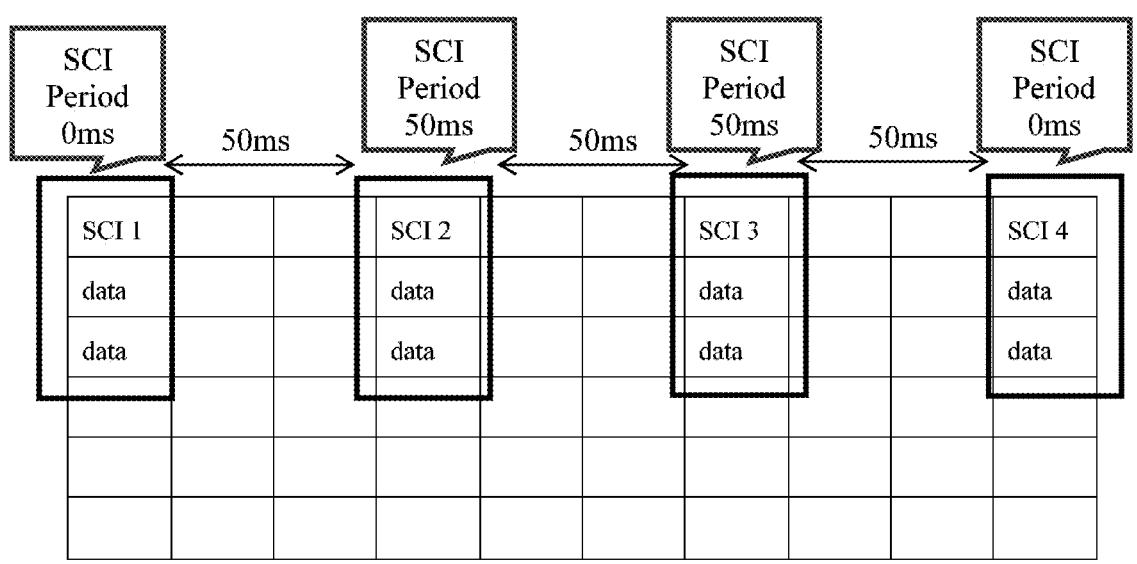
FIG. 9 illustrates energy sensing on a received control signal.

In one embodiment, a UE could conduct an energy sensing on the received control signal which indicates the scheduled first transmission is the last transmission, and the UE does not do the energy sensing on the resource(s) associated with the scheduled resource. An example is shown in FIG. 9. In this example, the UE will still do energy sensing based on SCI 4 and/or the corresponding data transmission. And the UE will not do an energy sensing based on the monitoring result of SCI 2 and SCI 3. For previous alternative, the UE will not do energy sensing based on SCI 4/SCI 3/SCI 2 and the corresponding data transmissions.

In some exemplary embodiments, the SCI is the control signaling. In one embodiment, the SCI with indicating period as 0 ms is the control signaling.

In some exemplary embodiments, the control signaling is the SCI. In one embodiment, the control signaling is a SCI with indicating period as 0 ms.

In some exemplary embodiments, multiple MAC PDU transmissions mean a period transmission. In one embodiment, multiple MAC PDUs are delivered in separate period transmissions, in which one (period) transmission delivers one MAC PDU.

In some exemplary embodiments, a single MAC PDU transmission means one shot transmission. In some exemplary embodiments, a single MAC PDU transmission means a non-period transmission. In some exemplary embodiments, the single MAC PDU transmission is delivered in one transmission.

In some exemplary embodiments, the energy sensing means that the UE performs a Received Signal Strength Indicator (RSSI) measurement.

In some exemplary embodiments, the metric means RSSI.

In some exemplary embodiments, the metric means linear average of a measured RSSI.

In some exemplary embodiments, the metric for a candidate resource means a linear average of a RSSI measured from the associated resources of the candidate resource. In some exemplary embodiments, the association means that the associated resources of the candidate resource occur with the same frequency resources as the candidate resource and occur with a time difference on one or multiple times of another time period from the candidate resource. In some exemplary embodiments, another time period is different from the time period of the first transmission. In some exemplary embodiments, another time period is the same as the time period of the first transmission.

In some exemplary embodiments, the control signaling and the first transmission are in the same Transmission Time Interval (TTI).

In some exemplary embodiments, the control signaling and the first transmission are in different TTIs.

In some exemplary embodiments, the control signaling and the first transmission are in different TTIs with a time gap. In some exemplary embodiments, the time gap is indicated via the control signaling.

In some exemplary embodiments, the control signaling and the first transmission are in different TTIs with the time difference on N times of a time period. In some exemplary embodiments, N is indicated via the control signaling. In one embodiment, N means there are N remaining (period) transmissions after the TTI of receiving the control signaling, and the first transmission is the last transmission. In some exemplary embodiments, the N remaining transmissions are period transmissions with a periodicity of the time period.

In some exemplary embodiments, the time period may be fixed/specified. In some exemplary embodiments, the time period may be configured via higher layer. In some exemplary embodiments, the time period may be indicated in the signaling. In some exemplary embodiments, the time period may be indicated in the control signaling.

In some exemplary embodiments, if there is a previous resource of a previous transmission before the scheduled resource of the first transmission and the previous resource is associated with the scheduled resource of the first transmission, the time period may be indicated/derived based on a previous control signaling which schedules the previous resource.

In some exemplary embodiments, the candidate resource associated with the scheduled resource of the first transmission may not be excluded by the previous resource of the previous transmission, wherein the previous resource of the previous transmission is associated with the scheduled resource of the first transmission.

In some exemplary embodiments, the time period is the minimum time difference between the previous resource and the scheduled resource of the first transmission.

In some exemplary embodiments, the time period is derived according to Time Division Duplex (TDD) Downlink/Uplink (DL/UL) configuration of a cell. In some exemplary embodiments, the UE performs sensing/receiving/transmission on the cell.

In some exemplary embodiments, the time period is derived according to the ratio of DL and UL of a cell. In some exemplary embodiments, the time period is derived according to a configuration related to DL and UL TTI distribution of a cell. In some exemplary embodiments, the time period is derived according to an indication related to DL and UL TTI distribution of a cell. In some exemplary embodiments, the UE performs sensing/receiving/transmission on the cell.

In some exemplary embodiments, the time period is in a unit of the slot. In some exemplary embodiments, the time period is derived according to an indication related to DL and UL TTI distribution of a cell. In some exemplary embodiments, the time period is in a unit of a mini-slot. In some exemplary embodiments, the time period is in a unit of a subframe. In some exemplary embodiments, the time period is in a unit of a symbol.

In some exemplary embodiments, the time period is in a unit of mini-seconds.

In some exemplary embodiments, a TTI is a slot. In some exemplary embodiments, a TTI is a subframe. In some exemplary embodiments, a TTI is a mini-slot. In some exemplary embodiments, a TTI is 1 ms.

In some exemplary embodiments, the resource of the first transmission may include one or multiple subchannels.

In some exemplary embodiments, the resource of the first transmission may include one or multiple (physical) resource blocks.

In some exemplary embodiments, the candidate resource may include one or multiple subchannels.

In some exemplary embodiments, the candidate resource may include one or multiple (physical) resource blocks.

In some exemplary embodiments, the first transmission and/or the control signaling transmission is a device-to-device transmission.

In some exemplary embodiments, the first transmission and/or the control signaling transmission is a Vehicle-to-Everything (V2X) transmission.

In some exemplary embodiments, the first transmission and/or the control signaling transmission is a Pedestrian-to-Everything (P2X) transmission.

In some exemplary embodiments, the first transmission and/or the control signaling transmission is on a LTE-V2X (PC5) interface.

In some exemplary embodiments, the first transmission and/or the control signaling transmission is a sidelink transmission.

In some exemplary embodiments, the previous transmission and/or the previous control signaling transmission is a device-to-device transmission.

In some exemplary embodiments, the previous transmission and/or the previous control signaling transmission is a V2X transmission.

In some exemplary embodiments, the previous transmission and/or the previous control signaling transmission is a P2X transmission.

In some exemplary embodiments, the previous transmission and/or the previous control signaling transmission is on PC5 interface.

In some exemplary embodiments, the previous transmission and/or the previous control signaling transmission is a sidelink transmission.

In some exemplary embodiments, the second transmission is device-to-device transmission.

In some exemplary embodiments, the second transmission is a V2X transmission.

In some exemplary embodiments, the second transmission is a P2X transmission.

In some exemplary embodiments, the second transmission is on a PC5 interface.

In some exemplary embodiments, the second transmission is a sidelink transmission.

According to one exemplary method, the UE receives a control signaling which schedules a resource of a first transmission, wherein the control signaling informs/indicates that the scheduled resource is not kept for next transmission; and the UE performs energy sensing for candidate resources, wherein resource(s) associated with the scheduled resource of the first transmission is not utilized for energy sensing.

In another method, the UE receives a control signaling which schedules a resource of a first transmission, wherein the control signaling informs/indicates that the first transmission is the last transmission; and the UE performs energy sensing for candidate resources, wherein the resource(s) associated with the scheduled resource of the first transmission is not utilized for energy sensing.

In one or more of the above-disclosed methods, the energy sensing result of the resource(s) associated with the scheduled resource of the first transmission is set to zero.

In one or more of the above-disclosed methods, the resource(s) associated with the scheduled resource of the first transmission means the previous resource(s) associated with the scheduled resource of the first transmission.

In one or more of the above-disclosed methods, the previous resource(s) associated with the scheduled resource of the first transmission means the resource(s) before the scheduled resource of the first transmission have the same frequency resources as the scheduled resource of the first transmission, and have a time difference on one or multiple times of a time period from the scheduled resource of the first transmission.

In one or more of the above-disclosed methods, the energy sensing result of the previous resource(s) associated with the scheduled resource of the first transmission is set to zero.

In one or more of the above-disclosed methods, the resource(s) associated with the scheduled resource of the first transmission means the resource of the first transmission.

In one or more of the above-disclosed methods, the energy sensing result of the scheduled resource of the first transmission is set to zero.

In one or more of the above-disclosed methods, the resource(s) associated with the scheduled resource of the first transmission means the latter resource(s) associated with the scheduled resource of the first transmission.

In one or more of the above-disclosed methods, the resource(s) associated with the scheduled resource of the first transmission not utilized for energy sensing includes the previous resource(s) associated with the scheduled resource of the first transmission and the resource of the first transmission.

In one or more of the above-disclosed methods, the latter resource(s) associated with the scheduled resource of the first transmission is utilized for energy sensing.

In one or more of the above-disclosed methods, the resource(s) after/posterior to the scheduled resource of the first transmission is utilized for energy sensing.

In one or more of the above-disclosed methods, the latter resource(s) associated with the scheduled resource of the first transmission means the resource(s) after the scheduled resource of the first transmission have the same frequency resources as the scheduled resource of the first transmission, and include the time difference on one or multiple times of a time period from the scheduled resource of the first transmission.

In one or more of the above-disclosed methods, the resource(s) after/posterior to the scheduled resource of the first transmission means the resource(s) after the scheduled resource of the first transmission have the same frequency resources as the scheduled resource of the first transmission, and include the time difference on one or multiple times of a time period from the scheduled resource of the first transmission.

In one or more of the above-disclosed methods, the resource(s) associated with the scheduled resource of the first transmission not utilized for energy sensing includes the previous resource(s) associated with the scheduled resource of the first transmission, the resource of the first transmission, and the latter resource(s) associated with the scheduled resource of the first transmission.

In one or more of the above-disclosed methods, the energy sensing result of the latter previous resource(s) associated with the scheduled resource of the first transmission is set as zero.

In one or more of the above-disclosed methods, the control signaling informs/indicates that the scheduled resource is not kept for the next transmission means that the control signaling indicates that there is no next scheduled transmission on the resource.

In one or more of the above-disclosed methods, the control signaling informs/indicates that the scheduled resource is not kept for the next transmission means that the control signaling indicates that the resource of the scheduled first transmission is not kept in next time.

In one or more of the above-disclosed methods, the control signaling informs/indicates that the scheduled resource is not kept for the next transmission means that the periodicity of the scheduled transmission is indicated as zero.

In one or more of the above-disclosed methods, the control signaling informs/indicates that the scheduled resource is not kept for the next transmission means that the scheduled transmission is not a periodic transmission.

In one or more of the above-disclosed methods, the control signaling informs/indicates that the scheduled resource is not kept for the next transmission means that the scheduled transmission is a periodic transmission to be released.

In one or more of the above-disclosed methods, the control signaling informs/indicates that the scheduled resource is not kept for the next transmission means that the scheduled transmission is the last transmission.

In one or more of the above-disclosed methods, the control signaling informs/indicates that the first transmission is the last transmission means that the control signaling indicates that there is no next scheduled transmission on the resource after the first transmission.

In one or more of the above-disclosed methods, the control signaling informs/indicates that the first transmission is the last transmission means that the control signaling indicates that the resource of the scheduled first transmission is not kept after the first transmission.

In one or more of the above-disclosed methods, the control signaling informs/indicates that the first transmission is the last transmission means that the periodicity of the scheduled transmission is indicated as zero.

In one or more of the above-disclosed methods, the control signaling informs/indicates that the first transmission is the last transmission means that the scheduled transmission is not a periodic transmission.

In one or more of the above-disclosed methods, the control signaling informs/indicates that the first transmission is the last transmission means that the scheduled transmission is a periodic transmission to be released.

According to one exemplary method, the UE receives a signaling indicates that a candidate resource is clear; and the UE performs energy sensing for candidate resources, except the indicated candidate resource.

In the above-disclosed methods, the signaling means a control signaling which schedules a resource of a first transmission and informs/indicates that the scheduled resource is not kept for the next transmission, and the indicated candidate resource means a candidate resource which is associated with the resource of the first transmission.

In one or more of the above-disclosed methods, the signaling means a control signaling which schedules a resource of a first transmission and informs/indicates that the scheduled resource of the first transmission is not kept in the next time, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is not a periodic transmission, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is a periodic transmission to be released, and the indicated candidate resource means a candidate resource which is associated with the resource of the first transmission.

In one or more of the above-disclosed methods, the signaling means a control signaling which schedules a resource of a first transmission and informs/indicates that the periodicity of the scheduled (first) transmission is indicated as zero, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is the last transmission, and the indicated candidate resource means a candidate resource which is associated with the resource of the first transmission.

In one or more of the above-disclosed methods, the indicated candidate resource includes the frequency resource of the scheduled first transmission in a frequency domain, and the indicated candidate resource has a time difference on one or multiple times of a time period from the resource of the scheduled first transmission.

In one or more of the above-disclosed methods, the UE does not perform energy sensing on resource(s) which are associated with the indicated candidate resource.

In one or more of the above-disclosed methods, the resource(s) associated with the indicated candidate resource means the resource(s) before the indicated candidate resource have the same frequency resources as the indicated candidate resource, and include the time difference on one or multiple times of a time period from the indicated candidate resource.

In one or more of the above-disclosed methods, the UE does not perform energy sensing on a resource(s) which is associated with the scheduled resource of the first transmission.

In one or more of the above-disclosed methods, the resource(s) associated with the scheduled resource of the first transmission includes previous resource(s) associated with the scheduled resource of the first transmission, the scheduled resource of the first transmission, the latter resource(s) associated with the scheduled resource of the first transmission, and/or the resource(s) after/posterior to the scheduled resource of the first transmission.

In one or more of the above-disclosed methods, the energy sensing result of the previous resource(s) associated with the scheduled resource of the first transmission, the scheduled resource of the first transmission, the latter resource(s) associated with the scheduled resource of the first transmission, and/or the resource(s) after/posterior to the scheduled resource of the first transmission is set as zero.

In one or more of the above-disclosed methods, the resource(s) associated with the scheduled resource of the first transmission include previous resource(s) associated with the scheduled resource of the first transmission and the scheduled resource of the first transmission.

In one or more of the above-disclosed methods, the energy sensing result of the previous resource(s) associated with the scheduled resource of the first transmission and the scheduled resource of the first transmission is set as zero.

In one or more of the above-disclosed methods, the previous resource(s) associated with the scheduled resource of the first transmission means the resource(s) before the scheduled resource of the first transmission have the same frequency resources as the scheduled resource of the first transmission, and have a time difference on one or multiple times of a time period from the scheduled resource of the first transmission.

In one or more of the above-disclosed methods, the latter resource(s) associated with the scheduled resource of the first transmission means the resource(s) after the scheduled resource of the first transmission have the same frequency resources as the scheduled resource of the first transmission, and have a time difference on one or multiple times of a time period from the scheduled resource of the first transmission.

In one or more of the above-disclosed methods, the resource(s) after/posterior to the scheduled resource of the first transmission means the resource(s) after the scheduled resource of the first transmission have the same frequency resources as the scheduled resource of the first transmission, and have the same time difference on one or multiple times of a time period from the scheduled resource of the first transmission.

According to one exemplary method, the UE receives a signaling indicates that a candidate resource is clear; the UE performs energy sensing for candidate resources; the UE selects valid resources from the candidate resources based on the energy sensing result of one or more candidate resources, wherein the indicated candidate resource is considered as a valid resource; and the UE performs a transmission on at least one of the valid resources.

In one or more of the above-disclosed methods, the signaling means a control signaling which schedules a resource of a first transmission and informs/indicates that the scheduled resource is not kept for the next transmission, and the indicated candidate resource means a candidate resource which is associated with the resource of the first transmission.

In one or more of the above-disclosed methods, the signaling means a control signaling which schedules a resource of a first transmission and informs/indicates that the scheduled resource of the first transmission is not kept for the next time, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is not a periodic transmission, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is a periodic transmission to be released, and the indicated candidate resource means a candidate resource which is associated with the resource of the first transmission.

In one or more of the above-disclosed methods, the signaling means a control signaling which schedules a resource of a first transmission and informs/indicates that the periodicity of the scheduled (first) transmission is indicated as zero, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is the last transmission, and the indicated candidate resource means a candidate resource which is associated with the resource of the first transmission.

In one or more of the above-disclosed methods, the indicated candidate resource includes the frequency resource of the scheduled first transmission, and the indicated candidate resource have a same time difference on one or multiple times of a time period from the resource of the scheduled first transmission.

According to one exemplary method, the UE receives a signaling indicates that a candidate resource is clear; and the UE performs energy sensing to a derive metric for candidate resources, wherein the metric of the indicated candidate resource is set as a specific value.

In one or more of the above-disclosed methods, the specific value is zero or considered as the smallest value.

In one or more of the above-disclosed methods, the specific value is the smallest value among the derived metric for candidate resources.

In one or more of the above-disclosed methods, the signaling means a control signaling which schedules a resource of a first transmission and informs/indicates that the scheduled resource is not kept for the next transmission, and the indicated candidate resource means a candidate resource which is associated with the resource of the first transmission.

In one or more of the above-disclosed methods, the signaling means a control signaling which schedules a resource of a first transmission and informs/indicates that the scheduled resource of the first transmission is not kept for the next time, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is not a periodic transmission, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is a periodic transmission to be released, and the indicated candidate resource means a candidate resource which is associated with the resource of the first transmission.

In one or more of the above-disclosed methods, the signaling means a control signaling which schedules a resource of a first transmission and informs/indicates that the periodicity of the scheduled (first) transmission is indicated as zero, and the indicated candidate resource means a candidate resource which is associated with the resource of the first transmission.

In one or more of the above-disclosed methods, the signaling means a control signaling which schedules a resource of a first transmission and informs/indicates that the scheduled first transmission is the last transmission, and the indicated candidate resource means a candidate resource which is associated with the resource of the first transmission.

In one or more of the above-disclosed methods, the indicated candidate resource includes the frequency resource of the scheduled first transmission, and the indicated candidate resource have the same time difference on one or multiple times of a time period from the resource of the scheduled first transmission.

In one or more of the above-disclosed methods, the energy sensing means that the UE performs RSSI measurement.

In one or more of the above-disclosed methods, the metric means a RSSI.

In one or more of the above-disclosed methods, the metric means a linear average of a measured RSSI.

In one or more of the above-disclosed methods, the metric for a candidate resource means a linear average of a RSSI measured from associated resources of the candidate resource, wherein the association means that the associated resources of the candidate resource has the same frequency resources as the candidate resource, and has a time difference on one or multiple times of another time period from the candidate resource.

In one or more of the above-disclosed methods, the another time period is different from the time period of the first transmission.

In one or more of the above-disclosed methods, the another time period is the same as the time period of the first transmission.

In one or more of the above-disclosed methods, the control signaling and the first transmission are in the same TTI.

In one or more of the above-disclosed methods, the control signaling and the first transmission are in different TTIs.

In one or more of the above-disclosed methods, the control signaling and the first transmission are in different TTIs with a time gap In one or more of the above-disclosed methods, the time gap is indicated via the control signaling.

In one or more of the above-disclosed methods, the control signaling and the first transmission are in different TTIs with time difference on N times of a time period.

In one or more of the above-disclosed methods, N is indicated via the control signaling.

In one or more of the above-disclosed methods, N means there are N remaining transmissions after the TTI of receiving the control signaling, and the first transmission is the last transmission.

In one or more of the above-disclosed methods, the N remaining transmissions are period transmissions with periodicity of the time period.

In one or more of the above-disclosed methods, the time period is fixed/specified.

In one or more of the above-disclosed methods, the time period is configured by a higher layer.

In one or more of the above-disclosed methods, the time period is indicated in the signaling.

In one or more of the above-disclosed methods, the time period is indicated in the control signaling.

In one or more of the above-disclosed methods, if there is a previous resource of a previous transmission before the scheduled resource of the first transmission and the previous resource is associated with the scheduled resource of the first transmission, the time period is indicated/derived from a previous control signaling which schedules the previous resource.

In one or more of the above-disclosed methods, the candidate resource associated with the scheduled resource of the first transmission is not excluded by the previous resource of the previous transmission, wherein the previous resource of the previous transmission is associated with the scheduled resource of the first transmission.

In one or more of the above-disclosed methods, the time period is the minimum time difference between the previous resource and the scheduled resource of the first transmission.

In one or more of the above-disclosed methods, the time period is derived according to the TDD DL/UL configuration of a cell, wherein the UE performs sensing/receiving/transmission on the cell.

In one or more of the above-disclosed methods, the time period is derived according to the ratio of DL and UL of a cell, wherein the UE performs sensing/receiving/transmission on the cell.

In one or more of the above-disclosed methods, the time period is derived according to a configuration related to DL and UL TTI distribution of a cell, wherein the UE performs sensing/receiving/transmission on the cell.

In one or more of the above-disclosed methods, the time period is derived according to an indication related to DL and UL TTI distribution of a cell, wherein the UE performs sensing/receiving/transmission on the cell.

In one or more of the above-disclosed methods, the time period is in a unit of slot.

In one or more of the above-disclosed methods, the time period is in unit of a mini-slot.

In one or more of the above-disclosed methods, the time period is in a unit of subframe.

In one or more of the above-disclosed methods, the time period is in a unit of symbol.

In one or more of the above-disclosed methods, the time period is in a unit of mini-seconds.

In one or more of the above-disclosed methods, a TTI is a slot, subframe, mini-slot, or is 1 ms.

In one or more of the above-disclosed methods, the resource of the first transmission includes one or multiple subchannels.

In one or more of the above-disclosed methods, the resource of the first transmission includes one or multiple (physical) resource blocks.

In one or more of the above-disclosed methods, the candidate resource includes one or multiple subchannels.

In one or more of the above-disclosed methods, the candidate resource includes one or multiple (physical) resource blocks.

In one or more of the above-disclosed methods, the first transmission and/or the control signaling transmission is a device-to-device transmission.

In one or more of the above-disclosed methods, the first transmission and/or the control signaling transmission is a V2X transmission.

In one or more of the above-disclosed methods, the first transmission and/or the control signaling transmission is a P2X transmission.

In one or more of the above-disclosed methods, the first transmission and/or the control signaling transmission is on a PC5 interface.

In one or more of the above-disclosed methods, the first transmission and/or the control signaling transmission is a sidelink transmission.

In one or more of the above-disclosed methods, the previous transmission and/or the previous control signaling transmission is a device-to-device transmission In one or more of the above-disclosed methods, the previous transmission and/or the previous control signaling transmission is a V2X transmission.

In one or more of the above-disclosed methods, the previous transmission and/or the previous control signaling transmission is a P2X transmission.

In one or more of the above-disclosed methods, the previous transmission and/or the previous control signaling transmission is on a PC5 interface.

In one or more of the above-disclosed methods, the previous transmission and/or the previous control signaling transmission is a sidelink transmission.

In one or more of the above-disclosed methods, the second transmission is a device-to-device transmission.

In one or more of the above-disclosed methods, the second transmission is a V2X transmission.

In one or more of the above-disclosed methods, the second transmission is a P2X transmission.

In one or more of the above-disclosed methods, the second transmission is on a PC5 interface.

In one or more of the above-disclosed methods, the second transmission is a sidelink transmission.

In one or more of the above-disclosed methods, the control signaling is a SCI.

In one or more of the above-disclosed methods, the control signaling is a SCI with an indicating period as 0 ms.

In one or more of the above-disclosed methods, a candidate resource is indicated as clear means that the candidate resource is not utilized/kept/reserved for transmission by another UE.

In one or more of the above-disclosed methods, a candidate resource is indicated as clear via a signaling means that the candidate resource is not utilized/kept/reserved for transmission by a UE sending the signaling.

In one or more of the above-disclosed methods, a candidate resource is indicated as clear means that the UE can select the candidate resource for performing transmission.

Figure 10:
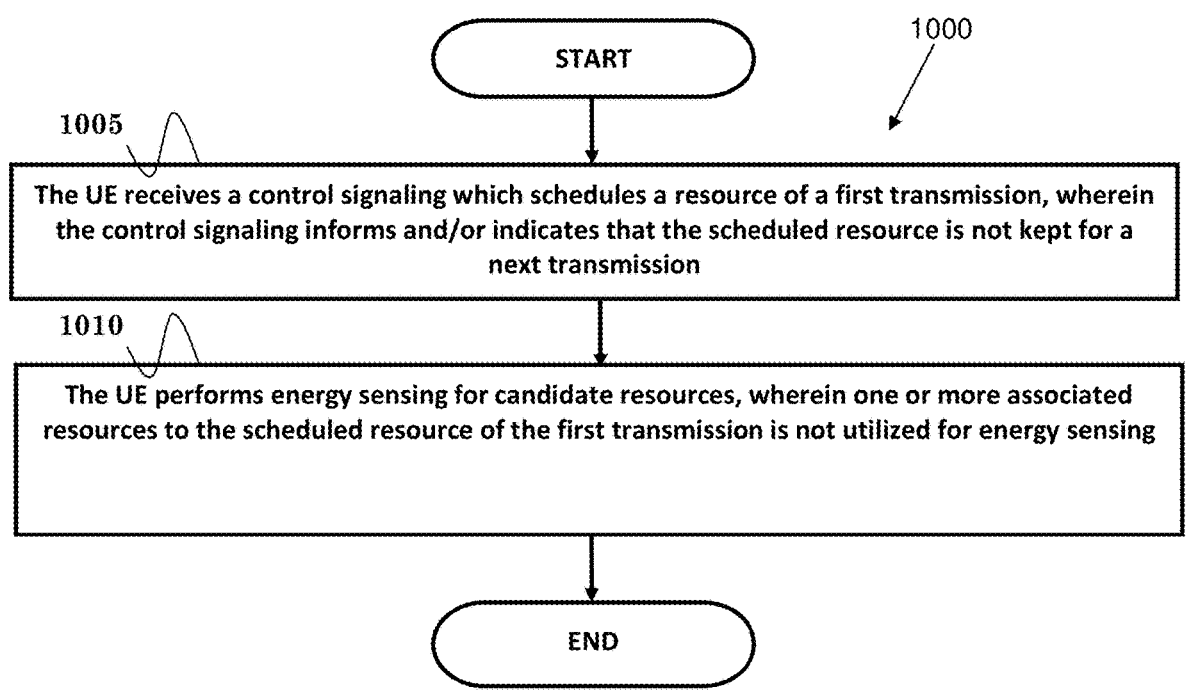
FIG. 10 is a flow diagram for one exemplary embodiment from the perspective of a User Equipment (UE).

FIG. 10 is a flow chart 1000 according to one exemplary embodiment from the perspective of a UE. In step 1005, the UE receives a control signaling which schedules a resource of a first transmission, wherein the control signaling informs and/or indicates that the scheduled resource is not kept for a next transmission. In step 1010, the UE performs energy sensing for candidate resources, wherein one or more resources associated with the scheduled resource of the first transmission is not utilized for energy sensing.

In another method, the UE receives a second control signaling which schedules a resource of a second transmission, wherein the second control signaling informs and/or indicates that the scheduled resource of the second transmission is a periodic transmission; and the UE excludes a candidate resource associated with the scheduled resource of the second transmission, wherein one or more resources associated with the scheduled resource of the second transmission is not utilized for energy sensing.

In another method, the UE performs energy sensing on one or more resources associated with the candidate resources, wherein the one or more resources not excluded by the control signaling are utilized for energy sensing.

In one or more of the above-disclosed methods, the one or more resources associated with the scheduled resource of the first transmission not utilized for energy sensing further comprises previous resource or resources associated with the scheduled resource of the first transmission and/or the resource of the first transmission, and wherein the previous resource or resources associated with the scheduled resource of the first transmission means the resource or resources before the scheduled resource of the first transmission have the same frequency resources as the scheduled resource of the first transmission, and include the time difference on one or multiple times of a time period from the scheduled resource of the first transmission.

In one or more of the above-disclosed methods, the time period is indicated and/or derived based on a previous control signaling which schedules the previous resource when there is a previous resource of a previous transmission before the scheduled resource of the first transmission and the previous resource is associated with the scheduled resource of the first transmission.

In one or more of the above-disclosed methods, the one or more resources associated with the scheduled resource of the second transmission not utilized for energy sensing further comprises the previous resource or resources associated with the scheduled resource of the second transmission and/or the resource of the second transmission, and the previous resource or resources associated with the scheduled resource of the second transmission means the resource or resources before the scheduled resource of the second transmission have the same frequency resources as the scheduled resource of the second transmission, and include the time difference on one or multiple times of a time period from the scheduled resource of the second transmission.

In one or more of the above-disclosed methods, an energy sensing result of the one or more resources associated with the scheduled resource of the first transmission and/or the previous resource or resources associated with the scheduled resource of the first transmission is set as zero.

In one or more of the above-disclosed methods, a latter resource or resources associated with the scheduled resource of the first transmission is utilized for energy sensing, wherein the latter resource or resources associated with the scheduled resource of the first transmission means the resource or resources after the scheduled resource of the first transmission have the same frequency resources as the scheduled resource of the first transmission, and include the time difference on one or multiple times of a time period from the scheduled resource of the first transmission.

In one or more of the above-disclosed methods, the control signaling informs and/or indicates that the scheduled resource is not kept for the next transmission means that the scheduled transmission is not a periodic transmission.

In one or more of the above-disclosed methods, the energy sensing means that the UE performs a Received Signal Strength Indicator (RSSI) measurement.

Figure 11:
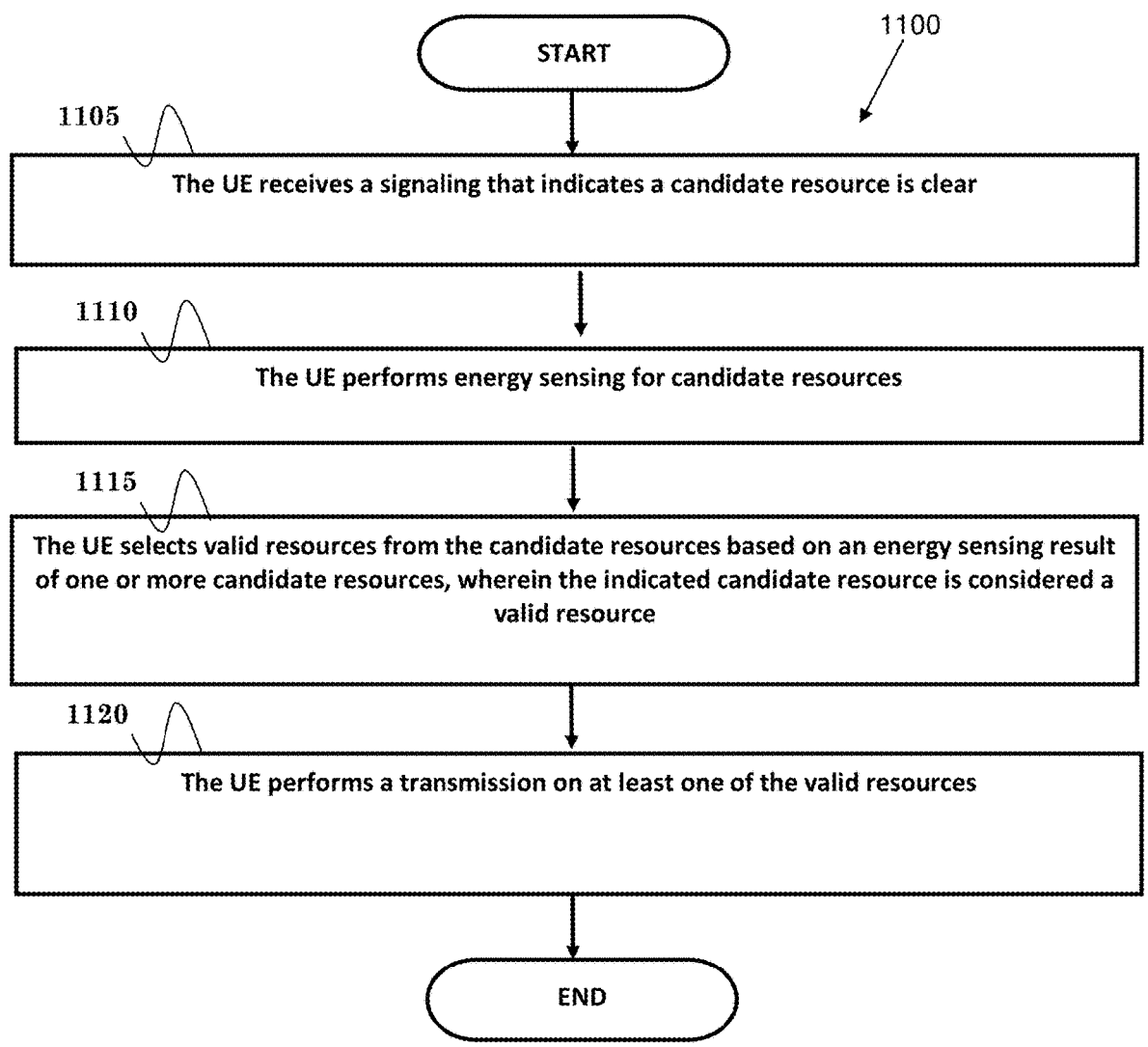
FIG. 11 is a flow diagram for one exemplary embodiment from the perspective of a UE.

FIG. 11 is a flow chart 1100 according to one exemplary embodiment from the perspective of a UE. In step 1105, the UE receives a signaling that indicates a candidate resource is clear. In step 1110, the UE performs energy sensing for candidate resources. In step 1115, the UE selects valid resources from the candidate resources based on an energy sensing result of one or more candidate resources, wherein the indicated candidate resource is considered a valid resource. In step 1120, the UE performs a transmission on at least one of the valid resources.

In another method, the UE performs energy sensing for candidate resources does not include the indicated candidate resource.

In one or more of the above-disclosed methods, the signaling is a control signaling which schedules a resource of a first transmission and informs and/or indicates that the scheduled resource is not kept for the next transmission, and the indicated candidate resource is a candidate resource which is associated with the resource of the first transmission.

In one or more of the above-disclosed methods, the signaling is a control signaling which schedules a resource of a first transmission and informs and/or indicates that the scheduled first transmission is not a periodic transmission, and the indicated candidate resource is a candidate resource which is associated with the resource of the first transmission.

In one or more of the above-disclosed methods, the indicated candidate resource further comprises a frequency resource of the scheduled first transmission, and the indicated candidate resource include the time difference on one or multiple times of a time period from the resource of the scheduled first transmission.

Figure 12:
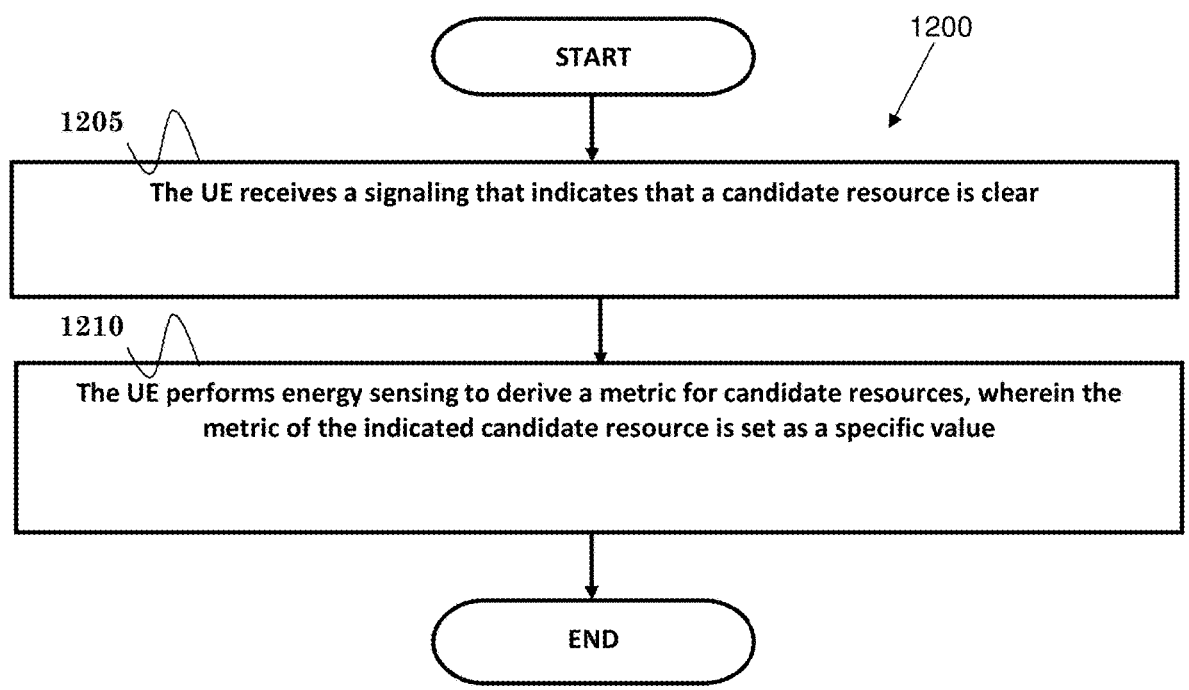
FIG. 12 is a flow diagram for one exemplary embodiment from the perspective of a UE.

FIG. 12 is a flow chart 1200 according to one exemplary embodiment from the perspective of a UE. In step 1205, the UE receives a signaling that indicates a candidate resource is clear. In step 1210, the UE performs energy sensing to derive a metric for candidate resources, wherein the metric of the indicated candidate resource is set as a specific value.

In another method, the specific value is zero or the smallest value among the derived metrics for the candidate resources.

In one or more of the above-disclosed methods, the signaling is a control signaling which schedules a resource of a first transmission and informs and/or indicates that the scheduled resource is not kept for the next transmission, and the indicated candidate resource is a candidate resource which is associated with the resource of the first transmission.

In one or more of the above-disclosed methods, the signaling is a control signaling which schedules a resource of a first transmission and informs and/or indicates that the scheduled first transmission is not a periodic transmission, and the indicated candidate resource is a candidate resource which is associated with the resource of the first transmission.

In one or more of the above-disclosed methods, the indicated candidate resource further comprises a frequency resource of the scheduled first transmission, and the indicated candidate resource include the time difference on one or multiple times of a time period from the resource of the scheduled first transmission.

As those skilled in the art will appreciate, the various disclosed embodiments may be combined to form new embodiments and/or methods.

Referring back to FIGS. 3 and 4, in one embodiment, the device 300 includes a program code 312 stored in memory 310. The CPU 308 could execute program code 312 to (i) receive a control signaling which schedules a resource of a first transmission, wherein the control signaling informs and/or indicates that the scheduled resource is not kept for a next transmission, and (ii) perform energy sensing for candidate resources, wherein one or more resources associated with the scheduled resource of the first transmission is not utilized for energy sensing.

In another embodiment, the device includes a program code 312 stored in the memory 310. The CPU 308 could execute program code 312 to (i) receive a signaling that indicates a candidate resource is clear, (ii) perform energy sensing for candidate resources, (iii) select valid resources from the candidate resources based on an energy sensing result of one or more candidate resources, wherein the indicated candidate resource is considered a valid resource, and (iv) perform a transmission on at least one of the valid resources.

In another embodiment, the device includes a program code 312 stored in the memory 310. The CPU 308 could execute program code 312 to (i) receive a signaling that indicates a candidate resource is clear, and (ii) perform energy sensing to derive a metric for candidate resources, wherein the metric of the indicated candidate resource is set as a specific value.

Furthermore, the CPU 308 can execute the program code 312 to perform all of the above-described actions and steps or others methods described herein.

The above-disclosed methods provide that a resource indicated as not used can be utilized without impact of sensing.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
receiving a control signaling which schedules a resource of a first transmission, wherein the control signaling informs and/or indicates that the scheduled resource is not kept for a next transmission;
performing energy sensing for candidate resources, wherein one or more resources associated with the scheduled resource of the first transmission is not utilized for energy sensing;
receiving a second control signaling which schedules a resource of a second transmission, wherein the second control signaling informs and/or indicates that the scheduled resource of the second transmission is a periodic transmission; and
excluding a candidate resource associated with the scheduled resource of the second transmission, wherein one or more resources associated with the scheduled resource of the second transmission is not utilized for energy sensing.

2. The method of claim 1, further comprising:
performing energy sensing on one or more resources associated with the candidate resources, wherein the one or more resources not excluded by the control signaling are utilized for energy sensing.

3. The method of claim 1, wherein the one or more resources associated with the scheduled resource of the first transmission not utilized for energy sensing further comprises previous resource or resources associated with the scheduled resource of the first transmission and/or the resource of the first transmission, and wherein the previous resource or resources associated with the scheduled resource of the first transmission means the resource or resources before the scheduled resource of the first transmission have the same frequency resources as the scheduled resource of the first transmission, and include the time difference on one or multiple times of a time period from the scheduled resource of the first transmission.

4. The method of claim 3, wherein the time period is indicated and/or derived based on a previous control signaling which schedules the previous resource when there is a previous resource of a previous transmission before the scheduled resource of the first transmission and the previous resource is associated with the scheduled resource of the first transmission.

5. The method of claim 1, wherein the one or more resources associated with the scheduled resource of the second transmission not utilized for energy sensing further comprises the previous resource or resources associated with the scheduled resource of the second transmission and/or the resource of the second transmission, and the previous resource or resources associated with the scheduled resource of the second transmission means the resource or resources before the scheduled resource of the second transmission have the same frequency resources as the scheduled resource of the second transmission, and include the time difference on one or multiple times of a time period from the scheduled resource of the second transmission.

6. The method of claim 1, wherein an energy sensing result of the one or more resources associated with the scheduled resource of the first transmission and/or the previous resource or resources associated with the scheduled resource of the first transmission is set as zero.

7. The method of claim 1, wherein a latter resource or resources associated with the scheduled resource of the first transmission is utilized for energy sensing, wherein the latter resource or resources associated with the scheduled resource of the first transmission means the resource or resources after the scheduled resource of the first transmission have the same frequency resources as the scheduled resource of the first transmission, and include the time difference on one or multiple times of a time period from the scheduled resource of the first transmission.

8. The method of claim 1, wherein the control signaling informs and/or indicates that the scheduled resource is not kept for the next transmission means that the scheduled transmission is not a periodic transmission.

9. The method of claim 1, wherein the energy sensing means that the UE performs a Received Signal Strength Indicator (RSSI) measurement.

10. A method of a User Equipment (UE), the method comprising:
receiving a signaling that indicates a candidate resource is clear, wherein the signaling is a control signaling which schedules a resource of a first transmission and informs and/or indicates that the scheduled resource is not kept for the next transmission, and the indicated candidate resource is a candidate resource which is associated with the resource of the first transmission;
performing energy sensing for candidate resources;
selecting valid resources from the candidate resources based on an energy sensing result of one or more candidate resources, wherein the indicated candidate resource is considered a valid resource;
performing a transmission on at least one of the valid resources;
receiving a second control signaling which schedules a resource of a second transmission, wherein the second control signaling informs and/or indicates that the scheduled resource of the second transmission is a periodic transmission; and
excluding a candidate resource associated with the scheduled resource of the second transmission, wherein one or more resources associated with the scheduled resource of the second transmission is not utilized for energy sensing.

11. The method of claim 10, wherein performing energy sensing for candidate resources does not include the indicated candidate resource.

12. The method of claim 10, wherein the signaling is a control signaling which schedules a resource of a first transmission and informs and/or indicates that the scheduled first transmission is not a periodic transmission, and the indicated candidate resource is a candidate resource which is associated with the resource of the first transmission.

13. The method of claim 10, wherein the indicated candidate resource further comprises a frequency resource of the scheduled first transmission, and the indicated candidate resource include the time difference on one or multiple times of a time period from the resource of the scheduled first transmission.

14. The method of claim 10, wherein performing energy sensing for candidate resources means to derive a metric for the candidate resources, and wherein the metric of the indicated candidate resource is set as a specific value.

15. The method of claim 14, wherein the specific value is zero or the smallest value among the derived metrics for the candidate resources.

* * * * *